Figure 5:
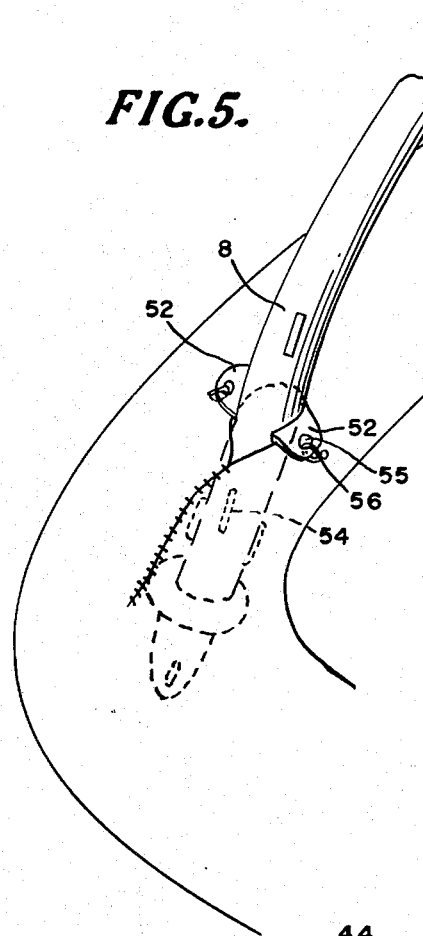

April 6, 1965   P. B. H'DOUBLER   3,176,690
CATHETER HAVING INTEGRAL, POLYMERIC FLANGES
Filed May 26, 1961

INVENTOR
PETER B. H'DOUBLER

BY Cushman, Darby & Cushman
ATTORNEYS

United States Patent Office 3,176,690
Patented Apr. 6, 1965

3,176,690
CATHETER HAVING INTEGRAL, POLYMERIC FLANGES
Peter B. H'Doubler, 155 Gerry Road,
Chestnut Hill 67, Mass.
Filed May 26, 1961, Ser. No. 112,833
3 Claims. (Cl. 128—348)

The present invention provides for the modification of tubular bodies used in medicine and particularly in surgery to convey material through the tube.

In present-day practice when attaching a tubular member such as a catheter, T tube, etc., to a patient, it is necessary to use some form of attaching means as stitching or a clamp-like device. This however, necessitates engaging or penetrating the tubular wall with the securing means with the attendant danger of structural damage. Such damage can cause leakage, thereby retarding and endangering the patient's recovery. Furthermore if the device is accidently dislodged at an untimely moment, the wall of the tubular member might rupture to the detriment of the patient's well-being. Even if no tearing of the wall takes place such securing means could cause damage to the lumen of the tubular member. It has been proposed to eliminate the inherent possibility of structural damage when using such tubular members to wrap a suturing material around the tubular member, when securing it to the patient. But there are definite drawbacks to this procedure. For example in tying down the tube, the wrapping may be too tight thereby restricting the passageway of the tube and obstructing the necessary flow of material. If it is wrapped too loosely, the tube will not be secure and can be easily dislodged or shifted.

Accordingly, it is an object of this invention to obviate those difficulties inherent in securing tubular devices, such as catheters, etc., utilized in medical and surgical practice by providing an improved method and means for safely and securely attaching the device to a patient.

It is another object of the present invention to provide means for the attachment of a tubular member to the patient in a variety of widely separated places.

It is another object of the present invention to provide a means for safely securing a tubular member when needed to a patient, but which securing means can be readily removed when there is no longer need for the tube.

Another object is to develop a tubular device which can be readily attached to the skin, stomach, intestine, urinary bladder, plenural cavity or other location in the body where it is important that the tube be securely fixed in position.

Other objects and the entire scope of the present invention will become apparent from the detailed description given hereinafter. It should be understood, however, that the detailed description and specific examples, while indicating the preferred embodiments of the invention, are given by way of illustration only, since various changes and modifications within the spirit and scope of this invention will become apparent as the description herein progresses.

According to the present invention there is no possibility of damaging the wall portion of a tubular member, used in medicine and surgery when attaching it to a patient, as the attaching means does not engage the normal wall of the device. It therefore can be safely affixed in a more secure manner. It has been found that these objects can be attained by providing the tubular device with an external flange or with one or more external projections for coacting with a securing means, e.g., thread, to safely attach the device to a patient. Apertures can be provided on the flange and projections for coaction with the securing means. The simplicity and ease of construction and use of the tubes of the present invention are of course all highly desirable features.

Figure 1:
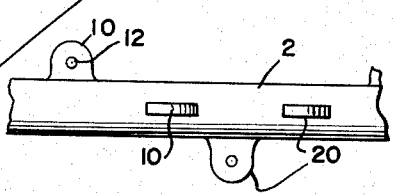
Figure 2:
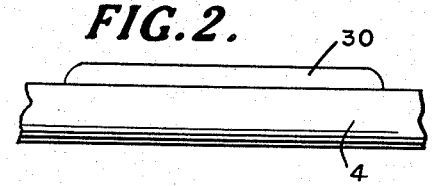
Figure 3:
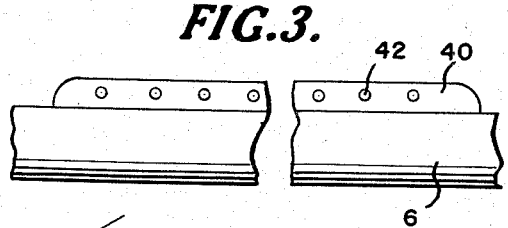
Figure 4:
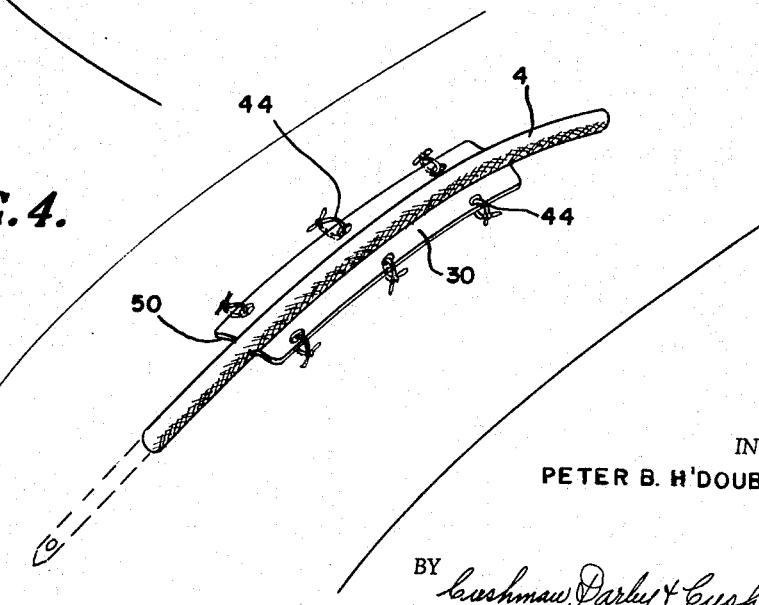

Reference is made to the accompanying drawings forming a part hereof, wherein like numerals refer to like parts throughout and in which:

FIGURE 1 is a partial perspective view of one type of surgical tube modified according to the invention;
FIGURE 2 is a partial perspective view illustrating a tube according to another embodiment of the invention;
FIGURE 3 is a partial view of still another tube according to the invention;
FIGURE 4 is a view illustrating the manner attaching another form of tube to a body cavity wall; and
FIGURE 5 is a view showing the manner of securing a Foley catheter.

Referring to FIGURE 1 there is provided a medical or surgical smooth-walled tubular body 2 which can be a section of a catheter or any such device for example made of rubber, or plastic such as nylon, polyethylene, polyurethane or butyl rubber polymer. The tube is provided with external tab-like projections 10 which can be made of the same or different material. Each of these projections 10 has an aperture 12 to assist in passing the securing means or suture material such as a dissolving thread made of polyvinyl alcohol or catgut through the structure when attaching the tube to a patient. It is, therefore, not necessary in any way for the securing means to contact the tube body-wall per se. This procedure eliminates the danger of damage to the tubular structure of the device and permits the unobstructed flow of material therethrough. The tab-like projections can be molded directly onto the tube. Any projections which are not needed to secure the tube to the patient can be readily removed, e.g. by cutting. In addition to the projections 10 FIGURE 1 illustrates the use of solid projection 20. All of the projections can either be solid or apertured if so desired.

These members may be positioned on more than one side of the tubular device and may be placed at any desired angle about the circumference of the tubular member, as in a staggered relationship or equidistantly every 90° from each other, 120°, 180°, etc. In some instances it is preferred to provide just one tab-like member. In such a case the tab can be either solid or apertured.

In FIGURE 2 the tubular member 4 is provided with an elongated external flange-like member 30. The flange can run for a portion or the entire length of the tube. Such a flange can be readily formed at the time of forming the tube. The tube can be secured to the patient by putting the thread carrying needle through the flange at any desired spot without danger of injury to the lumen of the tube. The flange can be made of polyurethane foam, sponge rubber or polyvinyl alcohol foam for example and the tube itself made of the same or different unfoamed material. The use of foamed polymer for the flange is an aid in permitting the needle or the like to penetrate the flange at any desired point. The use of a dissolvable material such as polyvinyl alcohol aids in the subsequent removal of the tube.

FIGURE 3 illustrates a flange-like member 40 which extends substantially along the length of the tubular member 6. The member 40 has a plurality of apertures 42 to coact with the securing means by passing the surgical thread or the like through the openings provided. Alternatively as stated in place of having an apertured elongated flange, the flange can be solid or it can be of foamed or porous construction.

It is within the scope of the present invention to provide a plurality of the elongated flange members 30 or 40 positioned on more than one side of the tubular member to assist in making the attachment.

FIGURE 4 illustrates the manner in which a plurality of flanges 30 would be used with the aid of surgical thread 44 to make the attachment of the tube 4 to the patient. That portion of the flange which is not being used to secure the tubular member can be removed by cutting, as at 50, eliminating unnecessary obstructions within the patient's body.

FIGURE 5 is a perspective view showing the attachment of a Foley catheter 8 to a patient's body tissue by means of the projections 52. Surgical thread 56 which is passed through aperture 58 cooperates in retaining the tube in place. Any projections which were originally provided and that are not needed in making the attachment and would normally be within the patient's body, have been removed by cutting as at 54.

The use of a soluble surgical thread, e.g. made from polyvinyl alcohol or catgut permits the securing of the tube in place for the desired time and then ready removal when it is no longer necessary to retain the tube in place. If desired nonsoluble thread made of nylon, polyethylene terephthalate (Dacron), cotton or the like can be used.

There are several ways of constructing a tubular member in accordance with the present invention. In making the medical or surgical device per se, the external portions such as the flange and/or the tab-like projections can be formed at the same time to construct a surgical article. Another method available is to attach the external areas by means of a suitable adhesive. Alternatively the tube wall can be heated to soften the same and the external projection adhered directly thereto before cooling.

In addition to the tubes illustrated above the invention is also suitable for use with other tubes which must be secured to a patient. Thus it is important that the tubes used for drainage of the common bile duct not be dislodged before planned removal. The attachment of an external flange or projection according to the present invention for cooperation with the suturing material insures this. It may be noted that it is desirable that the tube be securely fastened to the skin. The tube is small and soft and any suture tied about it to try to secure it would run the risk of blocking it if too tight and of not securing it, if too loose. With a flange as described, heavy suture material could be employed to hold the tube securely in place.

The invention can also be applied to whistle tip catheters, mushroom catheters, sump drains, etc. in other locations in the body and thereby prevent disaster of their untimely dislodging.

As previously indicated unneeded projections or portions of the flange can be removed with a scissors at the time of use.

I claim:
1. A tubular catheter adapted to be inserted in a patient, said catheter having a cylindrical outer wall and an external flange integrally secured to said outer cylindrical wall and projecting radially outwardly therefrom, said flange being constructed of a polymeric material, said polymeric material being compatible with and dissolvable in the body tissues.

2. A tubular catheter according to claim 1 wherein there are a plurality of said external flanges projecting radially outwardly from said outer cylindrical wall.

3. A tubular catheter adapted to be inserted in a patient, said catheter having a cylindrical outer wall and a plurality of external flanges integrally secured to the outer cylindrical wall and projecting radially outwardly therefrom, said flanges being constructed of a foamed polymeric material.

References Cited by the Examiner
UNITED STATES PATENTS

| | | | |
|---|---|---|---|
| 1,642,819 | 9/27 | Long | 128—350 |
| 1,810,466 | 6/31 | Deutsch | 128—348 |
| 2,092,512 | 9/37 | Hermann et al. | 128—335.5 |
| 2,393,002 | 1/46 | Smith | 128—349 |
| 2,670,735 | 3/54 | Brody | 128—214 |
| 2,729,618 | 1/56 | Müller et al. | 138—118 X |
| 2,750,232 | 6/56 | Szantay | 138—106 |
| 2,836,181 | 5/58 | Tapp | 128—334 |

FOREIGN PATENTS 1,167,605   8/58   France.

RICHARD A. GAUDET, *Primary Examiner.*

RICHARD J. HOFFMAN, JORDAN FRANKLIN,
*Examiners.*